(12) United States Patent
Ai et al.

(10) Patent No.: US 9,628,547 B2
(45) Date of Patent: Apr. 18, 2017

(54) MEDIA FILE RECEIVING AND MEDIA FILE SENDING METHODS, APPARATUSES, AND SYSTEMS

(71) Applicant: Huawei Technologies Co., Ltd., Shenzhen, Guangdong (CN)

(72) Inventors: Changquan Ai, Shenzhen (CN); Xin Liu, Shenzhen (CN); Yangpo Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 14/249,767

(22) Filed: Apr. 10, 2014

(65) Prior Publication Data
US 2014/0325018 A1    Oct. 30, 2014

(30) Foreign Application Priority Data
Apr. 24, 2013   (CN) .......................... 2013 1 0144851

(51) Int. Cl.
*H04L 29/08* (2006.01)
*H04L 29/06* (2006.01)

(52) U.S. Cl.
CPC .......... *H04L 67/06* (2013.01); *H04L 65/4084* (2013.01); *H04L 65/602* (2013.01); *H04L 65/608* (2013.01); *H04L 65/80* (2013.01)

(58) Field of Classification Search
CPC .............................. H04L 65/60; H04L 65/608
See application file for complete search history.

(56) References Cited

U.S. PATENT DOCUMENTS 9,294,531 B2 *    3/2016   Zhang ................... H04L 65/601
2011/0119695 A1 *  5/2011   Gregoire ................ H04H 60/32
                                                        725/14
(Continued)

FOREIGN PATENT DOCUMENTS

CN    101202900 A    9/2010
CN    102130936 A    7/2011
(Continued)

OTHER PUBLICATIONS

"Information technology—Dynamic adaptive streaming over HTTP (DASH)—Part 1: Media presentation description and segment formats", International Standard ISO/IEC 23009-1, Apr. 1, 2012, 132 pages.
(Continued)

*Primary Examiner* — Lashonda Jacobs

(57) ABSTRACT

Embodiments of the present invention provide media file receiving and media file sending methods, apparatuses, and systems. A media file receiving method includes: obtaining, by a client, an MPD fragment address of a first MPD fragment from a media presentation description MPD fragment index file according to a start-to-play time point requested by a user; sending, by the client, a first MPD fragment obtaining request including the MPD fragment address of the first MPD fragment to a server; receiving, by the client, the first MPD fragment fed back by the server, and sending a media segment obtaining request to the server according to media description information in the first MPD fragment; and receiving, by the client, a media segment fed back by the server. With the media receiving method according to the embodiments of the present invention, an objective of rapidly starting playing a media file can be achieved.

24 Claims, 6 Drawing Sheets

(56) References Cited

U.S. PATENT DOCUMENTS

| | | |
|---|---|---|
| 2011/0125919 A1 | 5/2011 | Kwon et al. |
| 2011/0231519 A1* | 9/2011 | Luby .................. H04N 21/23106 709/219 |
| 2012/0023254 A1* | 1/2012 | Park .................... H04L 65/4084 709/231 |
| 2012/0042050 A1 | 2/2012 | Chen et al. |
| 2012/0110120 A1* | 5/2012 | Willig ................. H04L 65/1016 709/217 |
| 2012/0290644 A1 | 11/2012 | Gabin et al. |
| 2013/0036234 A1* | 2/2013 | Pazos ................... H04L 12/189 709/231 |
| 2013/0042013 A1 | 2/2013 | Bouazizi |
| 2013/0117413 A1 | 5/2013 | Kaneko et al. |
| 2013/0212231 A1 | 8/2013 | Shi et al. |
| 2013/0291004 A1 | 10/2013 | Yuan et al. |
| 2014/0089518 A1 | 3/2014 | Zhang et al. |
| 2014/0137171 A1 | 5/2014 | Yue et al. |
| 2014/0317306 A1* | 10/2014 | Giladi .................. H04L 65/602 709/231 |
| 2015/0256981 A1* | 9/2015 | Chen ................... H04L 65/4084 370/312 |
| 2017/0006274 A1 | 1/2017 | Watanabe et al. |

FOREIGN PATENT DOCUMENTS

| | | |
|---|---|---|
| CN | 102137137 A | 7/2011 |
| CN | 102148851 A | 8/2011 |
| CN | 102714662 A | 10/2012 |
| EP | 2 592 809 A1 | 5/2013 |
| EP | 2733935 A1 | 5/2014 |
| JP | 2013-21574 A | 1/2013 |
| JP | 2013-511198 A | 3/2013 |
| JP | 2013-538506 A | 10/2013 |
| WO | WO 2011/147352 A1 | 12/2011 |
| WO | 2012011450 A1 | 1/2012 |
| WO | 2012096353 A1 | 7/2012 |

OTHER PUBLICATIONS

3rd Generation Partnership Project; Technical Specification Group Services and System Aspects; Transparent end-to-end Packet-switched Streaming Service (PSS); Progressive Download and Dynamic Adaptive Steaming over HTTP (3GP-DASH)(Release 10), 3GPP TS 26.247 V10.0.0, Jun. 2011, 94 pages.

\* cited by examiner

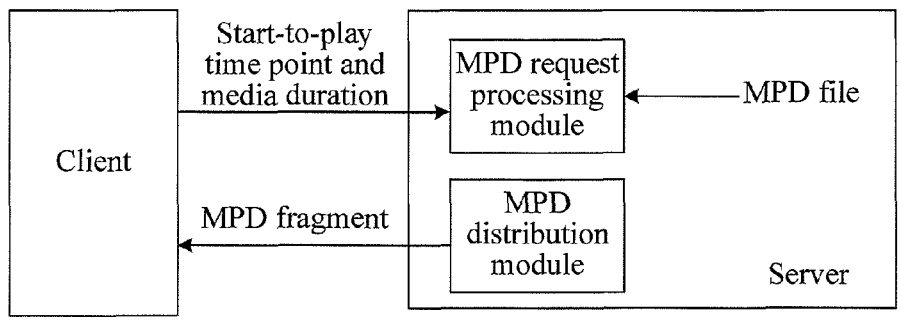

FIG. 4C

A client sends a media presentation description MPD fragment obtaining request including a start-to-play time point and a media duration to a server, so that the server determines, according to the start-to-play time point and the media duration, an MPD fragment corresponding to the start-to-play time point and the media duration ~51

The client receives the MPD fragment that is fed back by the server and corresponds to the start-to-play time point and the media duration ~52

The client sends a media segment obtaining request to the server according to the MPD fragment fed back by the server, so that the server searches for a media segment described by the MPD fragment ~53

The client receives the media segment fed back by the server and described by the MPD fragment ~54

FIG. 5

MEDIA FILE RECEIVING AND MEDIA FILE SENDING METHODS, APPARATUSES, AND SYSTEMS

CROSS-REFERENCE TO RELATED APPLICATIONS

This application claims priority to Chinese Patent Application No. 201310144851.9, filed with the Chinese Patent Office on Apr. 24, 2013, which is incorporated herein by reference in its entirety.

TECHNICAL FIELD

The present invention relates to a communications technology, and in particular, to media file receiving and media file sending methods, apparatuses, and systems.

BACKGROUND

A dynamic adaptive streaming over http (Dynamic Adaptive Streaming over HTTP, DASH for short) solution is a new generation media transmission solution that is promoted by international standards organizations: 3gpp and MPEG. Compared with an existing media transmission solution over http (such as Youku), a biggest difference of the DASH solution lies in that a client (a player end) can perform automatic adjustment according to a network condition, a condition of the client, and so on, and obtain a proper media stream for playing. When the network condition is good, the client may request a media stream of high quality for playing, and when the network becomes worse, the client may request a code stream, which is slightly low in quality and has a smaller bit rate, for playing. In this way, continuous playing at the client can be ensured and user experience can be improved.

A content preparation module located at a server end in a DASH system is responsible for preparing media content, slicing, and generating a media presentation description (Media Presentation Description, MPD for short) file. For example, during preparation of an a. mp4 program, code streams of 2 Mbps, 1 Mbps, and 500 kbps are generated separately to meet adaptive requirements, and corresponding media files are a_2000.mp4, a_1000.mp4, and a_500.mp4. For convenience of switching a code steam by a client at any time, these files further need to be segmented into small segment files (segment), for example, one segment at an interval of five seconds. Media segments generated by generating files of different bit rates are described by using MPD files. After being generated, an MPD file is transferred to an MPD distribution module at a server end for processing; and a media segment file is transferred to a media segment distribution module, that is, an Http Server, at the server end for processing. Steps that a DASH client plays a code stream usually are: A DASH client requests an MPD file from an MPD distribution module, parses the MPD file after obtaining the MPD file, and obtains a proper media segment (segment) for playing from a media segment distribution module according to media description information in the MPD file.

In the foregoing technical solution, when playing a media file, a DASH client needs to request an MPD file from a server end first; however, in some cases, for example, cases in which a duration of a program source is quite long, the number of media segments that are obtained through segmentation is quite large, the MPD file is quite large, which causes that time for the client to download the MPD file is too long. Furthermore, when the MPD file is quite large, the client also needs a certain period of time to parse the MPD file, which causes that time for the client to start playing is too long. Particularly, when this type of solution is applied to a handheld device, due to a limitation caused by a network bandwidth and a hardware capability of the handheld device, it takes a long time to download and parse an MPD file, thereby greatly affecting user experience.

SUMMARY

The present invention provides media file receiving and media file sending methods, apparatuses, and systems, so as to shorten obtaining time and parsing time for an MPD file, and achieve an objective of rapidly starting playing a media file.

In order to achieve the foregoing objective, according to a first aspect, an embodiment of the present invention provides a media file receiving method, where the method includes:

obtaining, by a client, an MPD fragment address of a first MPD fragment from a media presentation description MPD fragment index file according to a start-to-play time point requested by a user, where play time of a media segment corresponding to the first MPD fragment includes the start-to-play time point;

sending, by the client, a first MPD fragment obtaining request including the MPD fragment address of the first MPD fragment to a server, so that the server obtains the first MPD fragment from a pre-stored MPD fragment file according to the MPD fragment address of the first MPD fragment;

receiving, by the client, the first MPD fragment fed back by the server, and sending a media segment obtaining request to the server according to media description information in the first MPD fragment, so that the server obtains and feeds back, according to the media segment obtaining request, a media segment described by the first MPD fragment; and receiving, by the client, the media segment fed back by the server and described by the first MPD fragment.

According to the media file receiving method in the embodiment of the first aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the first aspect of the present invention, in a first possible implementation manner of the first aspect of the present invention, before the obtaining, by a client, an MPD fragment address of a first MPD fragment from a media presentation description MPD fragment index file according to a start-to-play time point requested by a user, the method further includes:

sending, by the client, an MPD fragment index file obtaining request to the server, and receiving the MPD fragment index file that is fed back by the server according to the MPD fragment index file obtaining request.

With reference to any foregoing embodiment, in a second possible implementation manner of the first aspect of the present invention, after the receiving, by the client, the first MPD fragment fed back by the server, the method further includes:

if a next play time point received by the client and requested by the user is within play time of the media segment described by the first MPD fragment, obtaining, by the client, a media segment corresponding to the next play time point from the server according to the media description information in the first MPD fragment.

According to a second aspect, an embodiment of the present invention provides a media file receiving method, where the method includes:

searching, by a client, a media presentation description MPD fragment index file for a first MPD fragment according to a start-to-play time point requested by a user, where play time of a media segment corresponding to the first MPD fragment includes the start-to-play time point, and the media presentation description MPD fragment index file includes at least one MPD fragment and includes a fragment address of the at least one MPD fragment; and if the client finds the first MPD fragment in the media presentation description MPD fragment index file, sending, by the client, a media segment request to a server according to media description information in the first MPD fragment, and receiving a media segment that is fed back by the server according to the media segment request and described by the first MPD fragment.

According to the media file receiving method in the embodiment of the second aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the second aspect of the present invention, in a first possible implementation manner of the second aspect of the present invention, the method further includes:

if the client fails to find the first MPD fragment in the MPD fragment index file, searching, by the client, the media presentation description MPD fragment index file for an MPD fragment address of the first MPD fragment according to the start-to-play time point requested by the user;

sending, by the client, a first MPD fragment obtaining request including the MPD fragment address of the first MPD fragment to the server, so that the server obtains the first MPD fragment from a pre-stored MPD fragment file according to the MPD fragment address of the first MPD fragment;

receiving, by the client, the first MPD fragment fed back by the server, and sending a media segment obtaining request to the server according to the media description information in the first MPD fragment, so that the server obtains and feeds back, according to the media segment obtaining request, the media segment described by the first MPD fragment; and receiving, by the client, the media segment fed back by the server and described by the first MPD fragment.

According to a third aspect, an embodiment of the present invention provides a media file sending method, where the method includes:

receiving, by a server, an MPD fragment obtaining request that is sent by a client and includes a media presentation description MPD fragment address, searching a pre-stored MPD fragment file for an MPD fragment corresponding to the MPD fragment address, and feeding back the found MPD fragment to the client; and receiving, by the server, a media segment request sent by the client, and feeding back a media segment corresponding to the media segment request to the client.

According to the media file sending method in the embodiment of the third aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the third aspect of the present invention, in a first possible implementation manner of the third aspect of the present invention, before the receiving, by a server, an MPD fragment obtaining request that is sent by a client and includes a media presentation description MPD fragment address, the method further includes:

receiving, by the server, an MPD fragment index file obtaining request sent by the client, and sending an MPD fragment index file corresponding to the MPD fragment index file obtaining request to the client, where index information of an MPD fragment in the MPD fragment index file includes a start-to-play time point and a media duration of a media segment described by the MPD fragment and an MPD fragment address of the MPD fragment.

With reference to any foregoing embodiment, in a second possible implementation manner of the third aspect of the present invention, before the receiving, by a server, an MPD fragment obtaining request that is sent by a client and includes a media presentation description MPD fragment address, the method further includes:

fragmenting, by the server, an MPD file according to a preset media duration to obtain at least one MPD fragment; and establishing, by the server, index information for each MPD fragment, and storing the index information in the MPD fragment index file, where index information of an MPD fragment in the MPD fragment index file includes a start-to-play time point and a media duration of a media segment described by the MPD fragment and an MPD fragment address of the MPD fragment.

According to a fourth aspect, an embodiment of the present invention provides a media file sending method, where the method includes:

receiving, by a server, a media presentation description MPD fragment obtaining request sent by a client, where the MPD fragment obtaining request includes a start-to-play time point and a media duration;

determining, by the server according to the start-to-play time point and the media duration, an MPD fragment corresponding to the start-to-play time point and the media duration, and feeding back the MPD fragment to the client;

receiving, by the server, a media segment obtaining request sent by the client, where a media segment requested by the media segment obtaining request is described by the MPD fragment; and feeding back, by the server according to the media segment obtaining request, the media segment described by the MPD fragment to the client.

According to the media file sending method in the embodiment of the fourth aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the fourth aspect of the present invention, in a first possible implementation manner of the fourth aspect of the present invention, the determining, by the server according to the start-to-play time point and the media duration, an MPD fragment corresponding to the start-to-play time point and the media duration includes:

parsing, by the server, a source MPD file according to the start-to-play time point and the media duration, and locating or assembling the MPD fragment corresponding to the start-to-play time point and the media duration in the source MPD file.

With reference to the embodiment of the fourth aspect of the present invention, in a second possible implementation manner of the fourth aspect of the present invention, the determining, by the server according to the start-to-play time point and the media duration, an MPD fragment corresponding to the start-to-play time point and the media duration, and feeding back the MPD fragment to the client includes:

searching, by the server according to the start-to-play time point and an MPD fragment index file, a pre-stored MPD fragment file for a first MPD fragment corresponding to a media segment whose play time includes the start-to-play time point; and feeding back, by the server, the first MPD fragment to the client.

With reference to the second possible implementation manner of the fourth aspect of the present invention, in a third possible implementation manner of the fourth aspect of the present invention, the determining, by the server according to the start-to-play time point and the media duration, an MPD fragment corresponding to the start-to-play time point and the media duration, and feeding back the MPD fragment to the client further includes:

if a media duration described by the first MPD fragment is shorter than the media duration, searching, by the server, for N MPD fragments following the first MPD fragment in the MPD fragment file and feeding back the N MPD fragments to the client until a total media duration of media segments described by the first MPD fragment and the N MPD fragments is longer than or equal to the media duration requested by the client, where N is a natural number.

According to a fifth aspect, an embodiment of the present invention provides a media file receiving method, where the method includes:

sending, by a client, a media presentation description MPD fragment obtaining request including a start-to-play time point and a media duration to a server, so that the server determines, according to the start-to-play time point and the media duration, an MPD fragment corresponding to the start-to-play time point and the media duration;

receiving, by the client, the MPD fragment that is fed back by the server and corresponds to the start-to-play time point and the media duration;

sending, by the client, a media segment obtaining request to the server according to the MPD fragment fed back by the server, so that the server searches for a media segment described by the MPD fragment; and receiving, by the client, the media segment that is fed back by the server and corresponds to the MPD fragment.

With reference to the embodiment of the fifth aspect of the present invention, in a first possible implementation manner of the fifth aspect of the present invention, the receiving, by the client, the MPD fragment that is fed back by the server and corresponds to the start-to-play time point and the media duration includes:

receiving, by the client, a first MPD fragment that is fed back by the server and corresponds to a media segment whose play time includes the start-to-play time point.

With reference to any foregoing embodiment, in a second possible implementation manner of the fifth aspect of the present invention, the receiving, by the client, the MPD fragment that is fed back by the server and corresponds to the start-to-play time point and the media duration further includes:

if a media duration described by the first MPD fragment is shorter than the media duration, receiving, by the client, N MPD fragments until a total media duration of media segments described by the first MPD fragment and the N MPD fragments is longer than or equal to the media duration requested by the client, where the N MPD fragments are fed back by the server, and N is a natural number.

With reference to any foregoing embodiment, in a third possible implementation manner of the fifth aspect of the present invention, the method further includes:

if play time of the media segment fed back by the server and described by the MPD fragment includes a next play time point, obtaining, by the client, a media segment corresponding to the next play time point from the server according to media description information in the MPD fragment fed back by the server.

According to a sixth aspect, an embodiment of the present invention provides a media file receiving apparatus, where the apparatus includes:

a searching module, configured to obtain an MPD fragment address of a first MPD fragment from a media presentation description MPD fragment index file according to a start-to-play time point requested by a user, where play-time of a media segment corresponding to the first MPD fragment includes the start-to-play time point;

a sending module, configured to send a first MPD fragment obtaining request including the MPD fragment address of the first MPD fragment to a server, so that the server obtains the first MPD fragment from a pre-stored MPD fragment file according to the MPD fragment address of the first MPD fragment, where the sending module is further configured to send a media segment obtaining request to the server according to media description information in the first MPD fragment, so that the server obtains and feeds back, according to the media segment obtaining request, a media segment described by the first MPD fragment; and a receiving module, configured to receive the first MPD fragment fed back by the server, where the receiving module is further configured to receive the media segment fed back by the server and described by the first MPD fragment.

According to the media file receiving apparatus in the embodiment of the sixth aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the sixth aspect of the present invention, in a first possible implementation manner of the sixth aspect of the present invention, the sending module is further configured to send an MPD fragment index file obtaining request to the server; and the receiving module is further configured to receive the MPD fragment index file that is fed back by the server according to the MPD fragment index file obtaining request.

According to a seventh aspect, an embodiment of the present invention provides a media file receiving apparatus, where the apparatus includes:

a searching module, configured to search a media presentation description MPD fragment index file for a first MPD fragment according to a start-to-play time point requested by a user, where play time of a media segment corresponding to the first MPD fragment includes the start-to-play time point, and the media presentation description MPD fragment index file includes at least one MPD fragment and includes a fragment address of the at least one MPD fragment;

a sending module, configured to, if the searching module finds the first MPD fragment in the media presentation description MPD fragment index file, send a media segment request to a server according to media description information in the first MPD fragment; and a receiving module, configured to receive a media segment that is fed back by the server according to the media segment request and described by the first MPD fragment.

According to the media file receiving apparatus in the embodiment of the seventh aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the seventh aspect of the present invention, in a first possible implementation manner of the seventh aspect of the present invention, the searching module is further configured to, if the searching module fails to find the first MPD fragment in the media presentation description MPD fragment index file, search the media presentation description MPD fragment index file for an MPD fragment address of the first MPD fragment according to the start-to-play time point requested by the user;

the sending module is further configured to send a first MPD fragment obtaining request including the MPD fragment address of the first MPD fragment to the server, so that the server obtains the first MPD fragment from a pre-stored MPD fragment file according to the MPD fragment address of the first MPD fragment;

the receiving module is further configured to receive the first MPD fragment fed back by the server;

the sending module is further configured to send a media segment obtaining request to the server according to the media description information in the first MPD fragment, so that the server obtains and feeds back, according to the media segment obtaining request, the media segment described by the first MPD fragment; and the receiving module is further configured to receive the media segment fed back by the server and described by the first MPD fragment.

According to an eighth aspect, an embodiment of the present invention provides a media file sending apparatus, where the apparatus includes:

a receiving module, configured to receive an MPD fragment obtaining request that is sent by a client and includes a media presentation description MPD fragment address;

a searching module, configured to search, according to the MPD fragment obtaining request received by the receiving module, a pre-stored MPD fragment file for an MPD fragment corresponding to the MPD fragment address; and a sending module, configured to feed back the MPD fragment found by the searching module to the client, where the receiving module is further configured to receive a media segment request sent by the client, and the sending module is further configured to feed back a media segment corresponding to the media segment request to the client.

According to the media file sending apparatus in the embodiment of the eighth aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the eighth aspect of the present invention, in a first possible implementation manner of the eighth aspect of the present invention, the receiving module is further configured to receive an MPD fragment index file obtaining request sent by the client; and the sending module is further configured to send an MPD fragment index file corresponding to the MPD fragment index file obtaining request to the client, where index information of an MPD fragment in the MPD fragment index file includes a start-to-play time point and a media duration of a media segment described by the MPD fragment and an MPD fragment address of the MPD fragment.

With reference to any foregoing embodiment, in a second possible implementation manner of the eighth aspect of the present invention, the apparatus further includes:

an MPD fragmenting module, where the MPD fragmenting module is configured to fragment an MPD file according to a preset media duration to obtain at least one MPD fragment; and is further configured to establish index information for each MPD fragment, and store the index information in the MPD fragment index file, where index information of an MPD fragment in the MPD fragment index file includes a start-to-play time point and a media duration of a media segment described by the MPD fragment and an MPD fragment address of the MPD fragment.

According to a ninth aspect, an embodiment of the present invention provides a media file sending apparatus, where the apparatus includes:

a receiving module, configured to receive a media presentation description MPD fragment obtaining request sent by a client, where the MPD fragment obtaining request includes a start-to-play time point and a media duration;

an MPD fragment determining module, configured to determine, according to the start-to-play time point and the media duration, an MPD fragment corresponding to the start-to-play time point and the media duration; and a sending module, configured to feed back the MPD fragment to the client, where the receiving module is further configured to receive a media segment obtaining request sent by the client, where a media segment requested by the media segment obtaining request is described by the MPD fragment; and the sending module is further configured to feed back the media segment described by the MPD fragment to the client.

With reference to the embodiment of the ninth aspect of the present invention, in a first possible implementation manner of the ninth aspect of the present invention, the MPD fragment determining module is specifically configured to:

parse a source MPD file according to the start-to-play time point and the media duration, and locate or assemble the MPD fragment corresponding to the start-to-play time point and the media duration in the source MPD file.

With reference to the embodiment of the ninth aspect of the present invention, in a second possible implementation manner of the ninth aspect of the present invention, the MPD fragment determining module is specifically configured to:

search, according to the start-to-play time point and an MPD fragment index file, a pre-stored MPD fragment file for a first MPD fragment corresponding to a media segment whose play time includes the start-to-play time point.

According to a tenth aspect, an embodiment of the present invention provides a media file transmission system, where the system includes:

a client and a server, where the client is configured to obtain an MPD fragment address of a first MPD fragment from a media presentation description MPD fragment index file according to a start-to-play time point requested by a user, where play time of a media segment corresponding to the first MPD fragment includes the start-to-play time point;

the client is further configured to send a first MPD fragment obtaining request including the MPD fragment address of the first MPD fragment to the server;

the server is configured to obtain the first MPD fragment from a pre-stored MPD fragment file according to the MPD fragment address of the first MPD fragment, and feed back the first MPD fragment to the client;

the client is further configured to receive the first MPD fragment fed back by the server, and send a media segment obtaining request to the server according to media description information in the first MPD fragment;

the server is further configured to obtain and feed back a media segment described by the first MPD fragment to the client according to the media segment obtaining request; and the client is further configured to receive the media segment fed back by the server and described by the first MPD fragment.

According to the media file transmission system in the embodiment of the tenth aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the tenth aspect of the present invention, in a first possible implementation manner of the tenth aspect of the present invention, the client is further configured to send an MPD fragment index file obtaining request to the server; and the server feeds back the MPD fragment index file to the client according to the MPD fragment index file obtaining request.

According to an eleventh aspect, an embodiment of the present invention provides a media file transmission system, where the system includes: a client and a server, where the client is configured to send a media presentation description MPD fragment obtaining request to the server, where the MPD fragment obtaining request includes a start-to-play time point and a media duration;

the server is configured to receive the media presentation description MPD fragment obtaining request sent by the client;

the server is further configured to determine, according to the start-to-play time point and the media duration, an MPD fragment corresponding to the start-to-play time point and the media duration, and feed back the MPD fragment to the client;

the client is further configured to receive the MPD fragment, and the client sends a media segment obtaining request to the server according to a media segment described by the MPD fragment;

the server is further configured to receive the media segment obtaining request sent by the client; and the server is further configured to feedback the media segment described by the MPD fragment to the client according to the media segment obtaining request.

According to the media file transmission system in the embodiment of the eleventh aspect of the present invention, after obtaining an MPD fragment, a client may instantly obtain a media segment described by the MPD fragment from a server according to media description information of the MPD fragment, and therefore, a delay that the client starts playing a media file is shortened, and an objective of rapidly starting playing the media file is achieved.

With reference to the embodiment of the eleventh aspect of the present invention, in a first possible implementation manner of the eleventh aspect of the present invention, the server is specifically configured to parse a source MPD file according to the start-to-play time point and the media duration, and locate or assemble the MPD fragment corresponding to the start-to-play time point and the media duration in the source MPD file.

With reference to the embodiment of the eleventh aspect of the present invention, in a second possible implementation manner of the eleventh aspect of the present invention, the server is specifically configured to search, according to the start-to-play time point and an MPD fragment index file, a pre-stored MPD fragment file for a first MPD fragment corresponding to a media segment whose play time includes the start-to-play time point; and feed back the first MPD fragment to the client.

BRIEF DESCRIPTION OF DRAWINGS

FIG. 4C is a schematic diagram of another implementation method of FIG. 4A;

FIG. 5 is a flowchart of still another media file receiving method according to an embodiment of the present invention;

DESCRIPTION OF EMBODIMENTS

Figure 1:
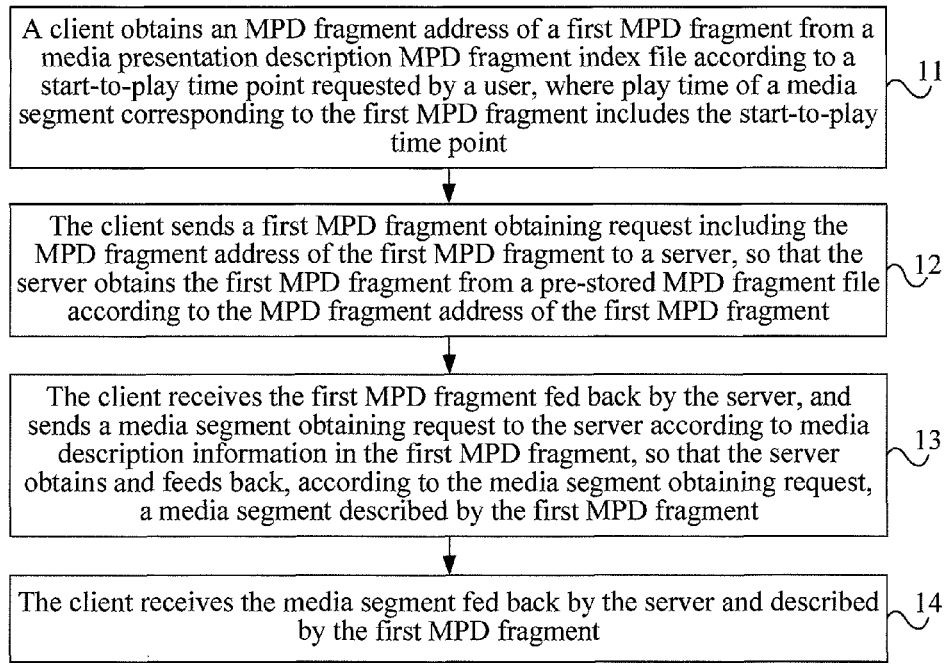
FIG. 1 is a flowchart of a media file receiving method according to an embodiment of the present invention.
Figure 2:
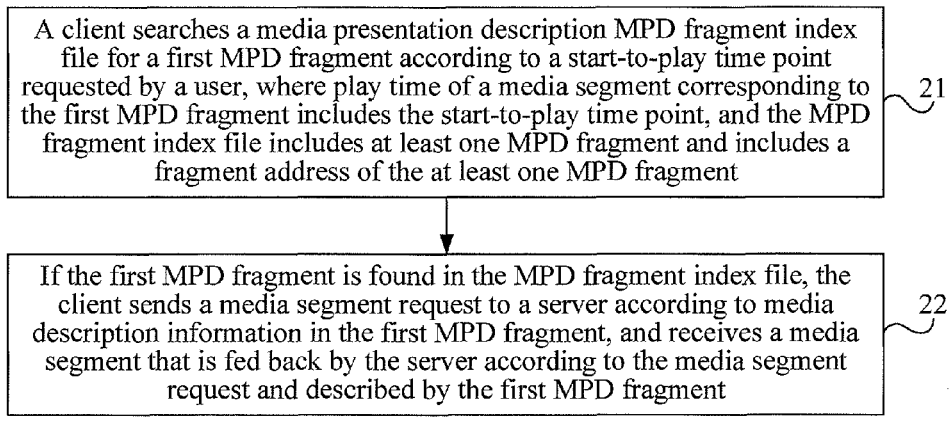
FIG. 2 is a flowchart of another media file receiving method according to an embodiment of the present invention.
Figure 3A:
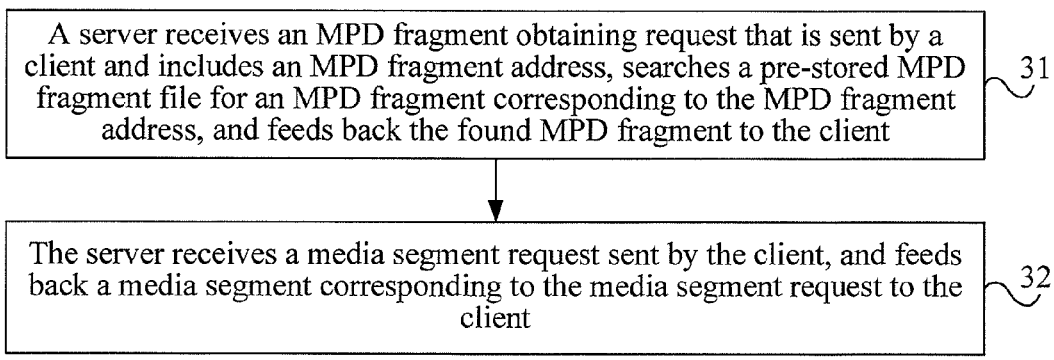
FIG. 3A is a flowchart of a media file sending method according to an embodiment of the present invention.

In method embodiments corresponding to FIG. 1, FIG. 2, and FIG. 3A, a server fragments an MPD file in advance to generate an MPD fragment file including at least one MPD fragment, and establishes an MPD fragment index file for the MPD fragment file, where the MPD fragment index file includes an MPD fragment address. Before obtaining a media segment from the server, a client sends an MPD fragment index file obtaining request to the server first, obtains an MPD fragment index file generated by the server, and then may determine an address of the MPD fragment according to the MPD fragment index file.

FIG. 1 is a flowchart of a media file receiving method according to an embodiment of the present invention. As shown in FIG. 1, the method according to this embodiment includes:

Step 11: A client obtains an MPD fragment address of a first MPD fragment from a media presentation description MPD fragment index file according to a start-to-play time point requested by a user, where play time of a media segment corresponding to the first MPD fragment includes the start-to-play time point.

According to play time of a media file described by an MPD file, a server fragments the MPD file to generate an MPD fragment file formed by multiple MPD fragments. One MPD fragment describes one or more media segments, and includes media description information describing the media segment. In the MPD fragment file, a media segment described by one MPD fragment corresponds to media data of a period of media time. After generating the MPD fragment file, the server establishes index information for the MPD fragment, and stores the index information in an MPD fragment index file. The MPD fragment index file includes a fragment address of at least one MPD fragment. Index information of an MPD fragment in the MPD fragment index file may include a start-to-play time point and a media duration of a media segment described by the MPD fragment and an address of the MPD fragment. The MPD fragment index file may be described by using XML language.

After receiving a user request including a start-to-play time point, the client starts playing media. In an initial stage, that is, when the client has not stored an MPD fragment index file, the client sends an MPD fragment index file obtaining request to the server first to obtain the MPD fragment index file generated by the server; or after receiving for the first time a user request including a start-to-play time point, the client may send an MPD fragment index file obtaining request to the server to obtain the MPD fragment index file generated by the server.

After receiving a user play request that is sent by a user and carries a start-to-play time point, the client parses the MPD fragment index file, and searches the MPD fragment index file for an MPD fragment address of an MPD fragment corresponding to a media segment whose play time includes the start-to-play time point. For example, the user drags a play progress bar on the client, a time point corresponding to a position where the dragging is stopped is the start-to-play time point of the user, and after the user presses a play button on the client, the client determines a request-to-play time point requested by the user, starts parsing the MPD fragment index file, and searches the MPD fragment index file for a first MPD fragment. The first MPD fragment is the MPD fragment corresponding to the media segment whose play time includes the start-to-play time point. Specifically, the client determines, by using a start-to-play time point and a media duration of a media segment in index information of the MPD fragment, play time of a media segment described by the MPD fragment, and if the start-to-play time point is within play time of a media segment described by an MPD fragment, that is, it is found that play time of a media segment described by an MPD fragment includes the start-to-play time point, determines that a media segment that is requested to be played is included in the media segment described by the MPD fragment.

Step 12: The client sends a first MPD fragment obtaining request including the MPD fragment address of the first MPD fragment to the server, so that the server obtains the first MPD fragment from a pre-stored MPD fragment file according to the MPD fragment address of the first MPD fragment.

Step 13: The client receives the first MPD fragment fed back by the server, and sends a media segment obtaining request to the server according to media description information in the first MPD fragment, so that the server obtains and feeds back, according to the media segment obtaining request, a media segment described by the first MPD fragment.

Step 14: The client receives the media segment fed back by the server and described by the first MPD fragment.

After finding an MPD fragment address in the MPD fragment index file, the client obtains a corresponding MPD fragment from the server according to the found MPD fragment address. Then, a media segment described by the MPD fragment is obtained from the server according to media description information of the MPD fragment fed back by the server.

Optionally, the MPD fragment index file further includes an address of an MPD file. In a case in which a bandwidth and a client capability permit, the MPD file may be obtained directly from the server. Alternatively, MPD fragment obtaining may be performed for several times first, and when a condition permits, the MPD file is then obtained.

Optionally, in order to further shorten a delay that the client starts playing a media file, the MPD fragment index file includes a first MPD fragment of an MPD fragment file. If a start-to-play time point requested by a user is within play time of a media segment described by the first MPD fragment, the client sends a media segment obtaining request to the server according to media description information in the first MPD fragment, and receives a media segment fed back by the server and described by the first MPD fragment. Therefore, when the client starts playing the media file from the start of the media, the client does not need to request the first MPD fragment from the server, and may obtain the media segment described by the first MPD fragment directly from the server according to the media description information in the first MPD fragment. The first MPD fragment of the MPD fragment file is a first MPD fragment obtained by fragmenting the MPD file according to the media duration, and the first MPD fragment is also an MPD fragment including an earliest play time point.

Further, in a playing process, when the user requests a media segment of a next play time point to be played, for example, in the playing process, the user drags a play progress bar on the client, a position where the dragging is stopped is a next start-to-play time point compared with a previous start-to-play time point, and at the time, the client determines whether the play time of the media segment that has already been fed back by the server and is described by the first MPD fragment includes the next start-to-play time point. If the next play time point received by the client and requested by the user is within the play time of the media segment described by the first MPD fragment, the client does not need to obtain a repeated MPD fragment from the server again, but obtains a media segment corresponding to the next play time point from the server according to the media description information in the first MPD fragment; otherwise, the client obtains the MPD fragment and the described media segment from the server according to the method provided in step 11 to step 13.

In the technical solution provided in this embodiment, before a client obtains a media segment of a start-to-play time point from a server, the client searches, according to a start-to-play time point requested by a user, an MPD fragment index file for an address of an MPD fragment corresponding to a media segment whose play time includes the start-to-play time point, and requests the corresponding MPD fragment from the server according to the found address. Therefore, the client obtains the MPD fragment corresponding to the media segment whose play time includes the start-to-play time point instead of a complete MPD file from the server. Because the MPD fragment is small, it takes the client a short time to obtain the MPD fragment, and it also takes the client a short time to parse the MPD fragment. After obtaining the MPD fragment, the client may instantly obtain a media segment described by the MPD fragment from the server according to media description information of the MPD fragment, and therefore, a delay that the client starts playing a media file is shortened, and an objective of rapidly starting playing the media file is achieved.

FIG. 2 is a flowchart of another media file receiving method according to an embodiment of the present invention. A main difference between the embodiment corresponding to FIG. 2 and the embodiment corresponding to FIG. 1 lies in that, an MPD fragment index file in FIG. 2 further includes at least one MPD fragment in addition to a fragment address of the at least one MPD fragment. As shown in FIG. 2, the method according to this embodiment includes:

Step 21: A client searches a media presentation description MPD fragment index file for a first MPD fragment according to a start-to-play time point requested by a user, where play time of a media segment corresponding to the first MPD fragment includes the start-to-play time point, and the MPD fragment index file includes at least one MPD fragment and includes a fragment address of the at least one MPD fragment.

According to play time of a media file described by an MPD file, a server fragments the MPD file to generate an MPD fragment file formed by multiple MPD fragments. After generating the MPD fragment file, the server establishes index information for the MPD fragment, and stores the index information in an MPD fragment index file. The MPD fragment index file includes a fragment address of at least one MPD fragment. Index information of an MPD fragment in the MPD fragment index file may include a start-to-play time point and a media duration of a media segment described by the MPD fragment and an address of the MPD fragment. The MPD fragment index file may be described by using XML language. Furthermore, in this embodiment, the server keeps at least one MPD fragment in the MPD fragment index file. For example, media description information corresponding to a short media duration may not be broken down, and the media description information corresponding to the short media duration is kept.

After receiving a user request including a start-to-play time point, the client starts playing media. In an initial stage, that is, when the client has not stored an MPD fragment index file, the client sends an MPD fragment index file obtaining request to the server first to obtain the MPD fragment index file generated by the server; or after receiving for the first time a user request including a start-to-play time point, the client may send an MPD fragment index file obtaining request to the server to obtain the MPD fragment index file generated by the server.

After receiving a user play request that is sent by a user and carries a start-to-play time point, the client parses the MPD fragment index file, and searches the MPD fragment index file for a first MPD fragment, where play time of a media segment corresponding to the first MPD fragment includes the start-to-play time point.

Step 22: If the first MPD fragment is found in the MPD fragment index file, the client sends a media segment request to the server according to media description information in the first MPD fragment, and receives a media segment that is fed back by the server according to the media segment request and described by the first MPD fragment.

If the client fails to find the first MPD fragment in the media presentation description MPD fragment index file, the client searches the media presentation description MPD fragment index file for an MPD fragment address of the first MPD fragment according to the start-to-play time point requested by the user, and then sends a first MPD fragment obtaining request including the MPD fragment address of the first MPD fragment to the server, so that the server obtains the first MPD fragment from a pre-stored MPD fragment file according to the MPD fragment address of the first MPD fragment. When the client receives the first MPD fragment fed back by the server, the client sends a media segment obtaining request to the server according to media description information in the first MPD fragment, so that the server obtains and feeds back, according to the media segment obtaining request, a media segment described by the first MPD fragment, and then the client receives the media segment fed back by the server and described by the first MPD fragment.

In the technical solution provided in this embodiment, before a client obtains a media segment of a start-to-play time point from a server, the client searches, according to a start-to-play time point requested by a user, an MPD fragment index file for an MPD fragment corresponding to a media segment whose play time includes the start-to-play time point, and obtains a media segment described by the MPD fragment from the server according to the found MPD fragment. Therefore, before obtaining the media segment, the client obtains the MPD fragment corresponding to the media segment whose play time includes the start-to-play time point instead of a complete MPD file from the server. Because the MPD fragment is small, it takes the client a short time to obtain the MPD fragment, and it also takes the client a short time to parse the MPD fragment. After obtaining the MPD fragment, the client may instantly obtain the media segment described by the MPD fragment from the server according to media description information of the MPD fragment, and therefore, a delay that the client starts playing a media file is shortened, and an objective of rapidly starting playing the media file is achieved.

FIG. 3A is a flowchart of a media file sending method according to an embodiment of the present invention. As shown in FIG. 3A, the method according to this embodiment includes:

Step 31: A server receives an MPD fragment obtaining request that is sent by a client and includes an MPD fragment address, searches a pre-stored MPD fragment file for an MPD fragment corresponding to the MPD fragment address, and feeds back the found MPD fragment to the client.

Step 32: The server receives a media segment request sent by the client, and feeds back a media segment corresponding to the media segment request to the client.

According to play time of a media file described by an MPD file, the server fragments the MPD file to generate an MPD fragment file formed by multiple MPD fragments. After generating the MPD fragment file, the server establishes index information for at least one MPD fragment, and stores the index information in an MPD fragment index file. The MPD fragment index file includes a fragment address of at least one MPD fragment. Index information of an MPD fragment in the MPD fragment index file may include a start-to-play time point and a media duration of a media segment described by the MPD fragment and an address of the MPD fragment. The MPD fragment index file may be described by using XML language. Furthermore, the server keeps at least one MPD fragment in the MPD fragment index file. For example, the server may not break down media description information corresponding to a short media duration, and keeps the media description information corresponding to the short media duration. The server may further add a first MPD fragment of the MPD fragment file to the MPD fragment index file. The first MPD fragment of the MPD fragment file is a first MPD fragment obtained by fragmenting the MPD file according to the media duration, and the first MPD fragment is also an MPD fragment including an earliest play time point.

Optionally, the server may further add an address of an MPD file to the MPD fragment index file. In a case in which a bandwidth and a client capability permit, the MPD file may be obtained directly from the server. Alternatively, MPD fragment obtaining may be performed for several times first, and when a condition permits, the MPD file is then obtained.

Optionally, the server adds the first MPD fragment of the MPD fragment file to the MPD fragment index file. The first MPD fragment of the MPD fragment file is the first MPD fragment obtained by fragmenting the MPD file according to the media duration, and the first MPD fragment is also the MPD fragment including the earliest play time point. If a start-to-play time point requested by a user is within play time of a media segment described by the first MPD fragment, the client sends a media segment obtaining request to the server according to media description information in the first MPD fragment, and receives a media segment fed back by the server and described by the first MPD fragment. Therefore, when the client starts playing a media file from the start of the media, the client does not need to request the first MPD fragment from the server, and may obtain the media segment described by the first MPD fragment directly from the server according to the media description information in the first MPD fragment, so as to further shorten a delay that the client starts playing the media file.

The server may fragment an MPD file according to a time dimension by using multiple methods to generate an MPD fragment file and establish an MPD fragment index file. Two methods are described in the following by using examples. One method is that: The server fragments an MPD file according to a media duration described by a Duration element in the MPD file to generate an MPD fragment, establishes, for each MPD fragment, a mapping between a play time point of the MPD fragment and an MPD fragment address, and stores the mapping in an MPD fragment index file.

Exemplarily, an MPD file a.mpd is provided in the following:

```
<?xml version="1. 0" encoding="UTF-8"?>
<MPD
    xmlns:xsi="http://www.w3. org/2001/XMLSchema-instance"
    xmlns="urn:mpeg:DASH:schema:MPD:2011"
    xsi:schemaLocation="urn:mpeg:DASH:schema:MPD:2011"
    type="static"
    mediaPresentationDuration="PT3256S"
    minBufferTime="PT10. 00S"
    profiles="urn:mpeg:dash:profiles:isoff-main:2011">
    <BaseURL>http://www.example.com/</BaseURL>
    <Period start="PT0. 00S" duration="PT1000. 00S">
        <SegmentList>
            <Initialisation sourceURL="seg-m-init. mp4"/>
        </SegmentList>
        <AdaptationSet mimeType="video/mp4" codecs="avc1">
            <Representation id="1" bandwidth="128000">
                <SegmentList duration="10">
                    <SegmentURL media="seg-m1-1. mp4"/>
                    <SegmentURL media="seg-m1-2. mp4"/>
                    <SegmentURL media="seg-m1-3. mp4"/>
                    . . . . . . . <several SegmentURLs are omitted herein>
                </SegmentList>
            </Representation>
            <Representation id="2" bandwidth="128000">
                <SegmentList duration="10">
                    <SegmentURL media="seg-m2-1. mp4"/>
                    <SegmentURL media="seg-m2-2. mp4"/>
                    <SegmentURL media="seg-m2-3. mp4"/>
                    . . . . . . . <several SegmentURLs are omitted herein>
                </SegmentList>
            </Representation>
            . . . . . . . <several Representations are omitted herein>
        </AdaptationSet>
    </Period>
    . . . . . . . <several Periods are omitted herein>
    <Period duration="PT200. 00S">
        . . . . . . . (media description information)
    </Period>
    <Period duration="PT1200. 00S">
        . . . . . . . (media description information)
    </Period>
</MPD>
```

Figure 3B:
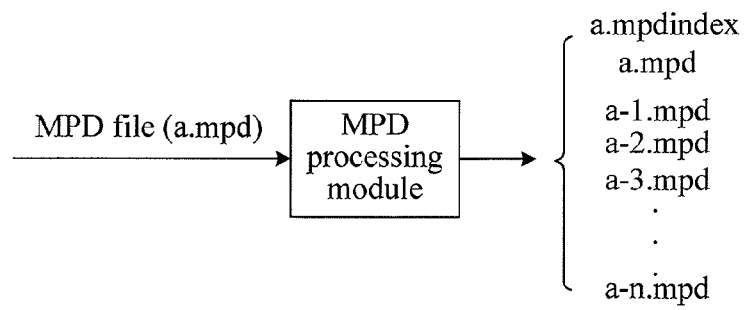
FIG. 3B is a schematic diagram showing that a server fragments an MPD file according to an embodiment of the present invention.

In the foregoing Mpd file, time information, namely a media duration, of each media segment is described by using a duration element in SegmentURL. As shown in FIG. 3B, an MPD processing module in the server may fragment the MPD file a.mpd according to the media duration described by the Duration element in the MPD file to generate MPD fragments: a-1.mpd, a-2.mpd, a-3.mpd, a-4.mpd, . . . , a-n.mpd. The server establishes index information for the foregoing MPD fragment, and stores the index information in an MPD fragment index file. Exemplarily, an MPD fragment index file a.mpdindex established according to the foregoing method is provided in the following:

```
<MPDINDEX>
    <ORIGINALMPD url="http://www.example.com/a.mpd" />
    <MPDFRAGMENTS>
        <FRAGMENT start=0s duration=120s
            url=" http://www.example.com/a/fragments/a-1.mpd"/>
        <FRAGMENT start=120s duration=120s
            url=" http://www.example.com/a/fragments/a-2.mpd"/>
        <FRAGMENT start=240s duration=120s
```

```
        url=" http://www.example.com/a/fragments/a-3.mpd"/>
      <FRAGMENT start=360s duration=120s
        url=" http://www.example.com/a/fragments/a-4.mpd"/>
        ........................
      <FRAGMENT start=7200s duration=120s
        url= "http://www.example.com/a/fragments/a-n.mpd"/>
    </MPDFRAGMENTS>
</ MPDINDEX >
```

In the foregoing MPD fragment index file, an ORIGINALMPD element describes a URL of the MPD file, and an MPDFRAGMENTS element describes an MPD fragment file formed by all MPD fragments. The element for describing the URL of the MPD file may be kept in the MPD fragment index file. In the MPDFRAGMENTS element, a FRAGMENT element describes index information of an MPD fragment. An attribute Start describes a start time point of a media segment described by an MPD fragment, an attribute Duration describes a media duration of the media segment, and an element url describes a url of the MPD fragment. In a case in which the attribute Start can be obtained according to a context, the attribute Start may be omitted. For example, in the foregoing MPD fragment index file, except for an attribute Start in a first FRAGMENT, attributes Start of the rest FRAGMENTs all may be omitted. Information described by the first FRAGMENT is that: An MPD fragment that describes a media file that starts from a second 0 and has a duration of 120 seconds may be obtained according to a URL: http://www.example.com/a/fragments/a-1.mpd.

Optionally, the MPD fragment index file may further include a first MPD fragment. In the following MPD fragment index file a.mpdindex, an MPD element is added in the MPD fragment index file, and describes the first MPD fragment; and when a client starts playing a media file from the start of the media, the client does not need to request the first MPD fragment from the server, and may parse media description information in the first MPD fragment, and obtains a media segment described by the first MPD fragment directly from the server.

```
<MPDINDEX>
  <ORIGINALMPD url="http://www.example.com/a.mpd" />
  <MPDFRAGMENTS>
    <FRAGMENT start=0s duration=120s
      url=" http://www.example.com/a/fragments/a-1.mpd"
      <MPD>
      ...........
      </MPD>
    <FRAGMENT />
    <FRAGMENT start=120s duration=120s
      url=" http://www.example.com/a/fragments/a-2.mpd"/>
    <FRAGMENT start=240s duration=120s
      url=" http://www.example.com/a/fragments/a-3.mpd"/>
    <FRAGMENT start=360s duration=120s
      url=" http://www.example.com/a/fragments/a-4.mpd"/>
      ........................
    <FRAGMENT start=7200s duration=120s
      url=" http://www.example.com/a/fragments/a-n.mpd"/>
  </MPDFRAGMENTS>
</ MPDINDEX >
```

The other MPD file fragmentation method and MPD fragment index file establishment method provided in the present invention are that: A server fragments an MPD file according to a media duration described by a Period element in the MPD file, so as to generate an MPD fragment; and establishes index information for the MPD fragment, and stores the index information in an MPD fragment index file. In the foregoing MPD file a.mpd, three Periods are described, and durations of the three Periods are 2000 seconds, 200 seconds, and 1200 seconds. The server may break down a Period with a long duration, and may keep a Period with a short duration unchanged.

Exemplarily, an MPD fragment index file established according to the foregoing method is provided in the following:

```
<MPD>
  .......
  <Period start="PT0. 00S" duration="PT200. 00S"
    xlink="a-1.mpd" />
    <Period duration="PT200. 00S" xlink="a-2.mpd" />
    <Period duration="PT200. 00S" xlink="a-3.mpd" />
    ...............
    <Period duration="PT200. 00S" xlink="a-10.mpd" />
    <Period duration="PT200. 00S" >
  ........ (media description information)
  </Period>
  <Period duration="PT200. 00S" xlink="a-11.mpd" />
  ...............
   <Period duration="PT200. 00S" xlink="a-16.mpd" />
</ MPD>
```

A first Period in an original MPD file a.mpd is broken down into 10 new Periods, and a duration of each new Period is 200 seconds. Each new Period obtained through breakdown is described by using one MPD fragment, and the new Period is described in the MPD fragment index file. For example, a first newly generated Period is described as:

<Period start="PT0. 00S" duration="PT200. 00S" xlink="a-1.mpd" /> where the duration represents a duration of the new Period, that is, a duration of an MPD fragment, and a newly added attribute xlink represents a url of the MPD fragment corresponding to the new Period.

In the original MPD file a.mpd, a duration of a second Period is relatively short, and media description information described by the second Period is not broken down during processing, and kept unchanged; or, in order to further downsize the MPD fragment, media description information of the Period is separated, and description is also made in the Period by using the attribute xlink.

Further, as shown in the following MPD fragment index file, the MPD fragment index file may further include a first MPD fragment, that is, media description information of the first Period.

```
<MPD>
  .......
  <Period start="PT0. 00S" duration="PT200. 00S" >
  ......... (media description information of the first Period is
    kept)
  </Period>
  <Period duration="PT200. 00S" xlink="a-1.mpd" />
  <Period duration="PT200. 00S" xlink="a-2.mpd" />
  ...............
  </ MPD>
```

Figure 4A:
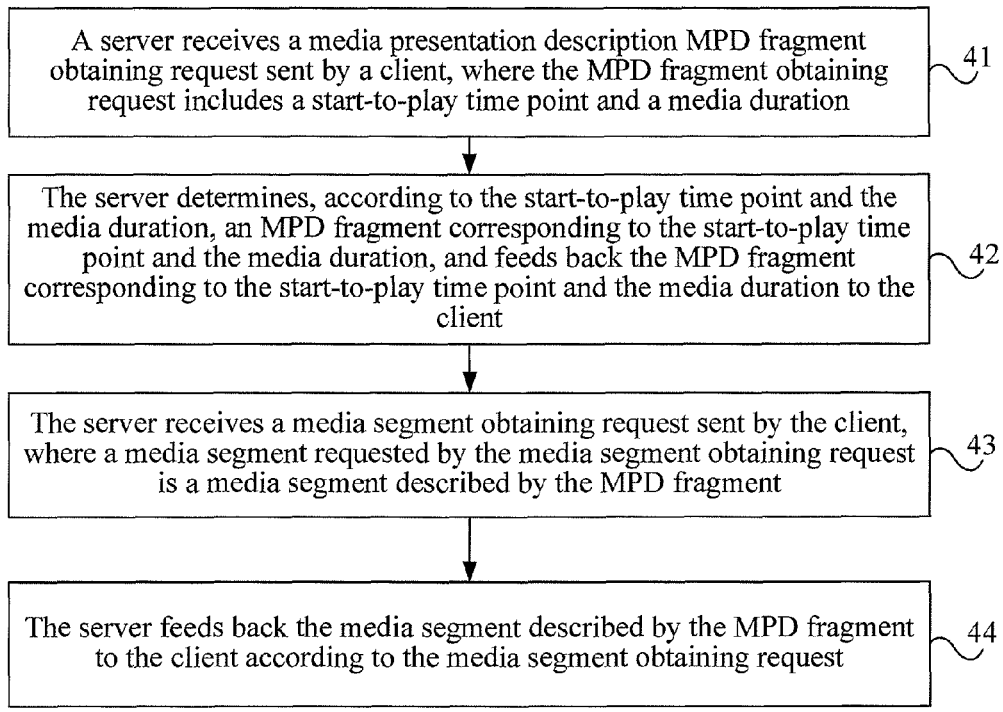
FIG. 4A is a flowchart of another media file sending method according to an embodiment of the present invention.

A main difference between the following method embodiments corresponding to FIG. 4A and FIG. 5 and the method embodiments corresponding to FIG. 1, FIG. 2, and FIG. 3A lies in that: When starting playing media, a client does not need to obtain an MPD fragment index file from a server, but requests an MPD fragment corresponding to a start-to-play time point and a media duration directly from the server.

FIG. 4A is a flowchart of another media file sending method according to an embodiment of the present invention. As shown in FIG. 4A, the method according to this embodiment includes:

Step 41: A server receives a media presentation description MPD fragment obtaining request sent by a client, where the MPD fragment obtaining request includes a start-to-play time point and a media duration.

The client may carry a media duration of an MPD fragment obtaining requested from the server in the MPD fragment obtaining request, and the server feeds back the MPD fragment to the client according to the start-to-play time point and media duration that are requested by the client. The client may also not carry a media duration in the MPD fragment obtaining request, but negotiates the media duration with the server in advance. After receiving the MPD fragment obtaining request, the server feeds back the MPD fragment to the client according to a play time point and a default media duration.

Step 42: The server determines, according to the start-to-play time point and the media duration, an MPD fragment corresponding to the start-to-play time point and the media duration, and feeds back the MPD fragment corresponding to the start-to-play time point and the media duration to the client.

According to play time of a media file described by an MPD file, the server may fragment the MPD file in advance to generate an MPD fragment file formed by multiple MPD fragments. Each MPD fragment describes a media segment of a period of media time, and each MPD fragment may describe one or more media segments. Content in an MPD fragment is media description information describing a media segment. The server establishes index information for the MPD fragment, and stores the index information in an MPD fragment index file. The index information of the MPD fragment includes a start time point and a media duration of a media segment described by the MPD fragment and an address of the MPD fragment in the MPD fragment file. The MPD fragment index file may be described by using XML language.

In a case in which the server has statically fragmented the MPD file in advance, after the server receives the MPD fragment obtaining request from the client, the server searches the MPD fragment file for a first MPD fragment according to the start-to-play time point requested by the client and the MPD fragment index file, where play time of a media segment described by the first MPD fragment includes the start-to-play time point requested by the client. Further, if a media duration described by the first MPD fragment is shorter than a media duration requested or preset by the client, the server continues to search in sequence for N MPD fragments following the first MPD fragment in the MPD fragment file. The searching is stopped until a sum of media durations of all found MPD fragments is longer than or equal to the media duration requested by the client, where N is a natural number.

Figure 4B:
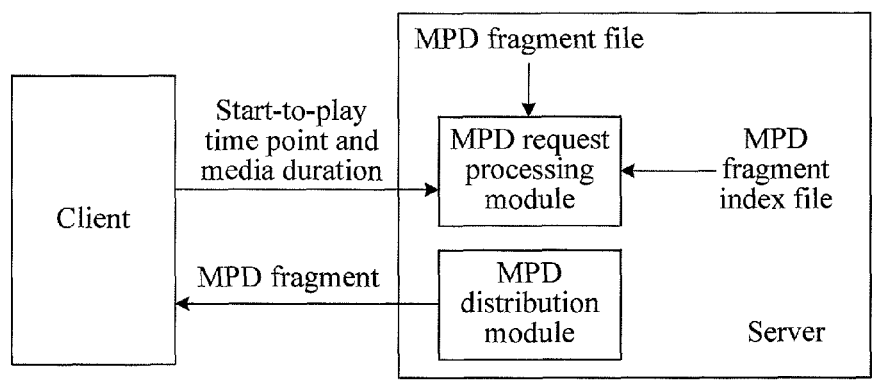
FIG. 4B is a schematic diagram of an implementation method of FIG. 4A.

As shown in FIG. 4B, after the server receives the MPD fragment obtaining request that is sent by the client and includes the start-to-play time point and the media duration, an MPD request processing module searches the MPD fragment index file for the MPD fragment corresponding to the start-to-play time point and the media duration. An MPD fragmenting module feeds back the MPD fragment that is found by the MPD request processing module and corresponds to the start-to-play time point and the media duration to the client. For example, the client sends http://www.example.com/a.mpd?start=0&timespan=120, which indicates that the client requests an MPD fragment that describes a media segment starting from second 0 and has a duration of 120 seconds from the server.

The server may also not fragment the MPD file in advance to generate the MPD fragment file, but fragment the MPD file dynamically after receiving the MPD fragment obtaining request sent by the client. As shown in FIG. 4C, after the server receives the MPD fragment obtaining request that is sent by the client and includes the start-to-play time point and the media duration, the MPD request processing module parses the MPD file, and locates or assembles the MPD fragment corresponding to the requested start-to-play time point and media duration in the MPD file. The MPD fragmenting module feeds back the located MPD fragment to the client.

Step 43: The server receives a media segment obtaining request sent by the client, where a media segment requested by the media segment obtaining request is a media segment described by the MPD fragment.

Step 44: The server feeds back the media segment described by the MPD fragment to the client according to the media segment obtaining request.

FIG. 5 is a flowchart of still another media file receiving method according to an embodiment of the present invention. As shown in FIG. 5, the method according to this embodiment includes:

Step 51: A client sends a media presentation description MPD fragment obtaining request including a start-to-play time point and a media duration to a server, so that the server determines, according to the start-to-play time point and the media duration, an MPD fragment corresponding to the start-to-play time point and the media duration.

After receiving a user request including a start-to-play time point and a media duration, the client carries the start-to-play time point and the media duration in an MPD fragment obtaining request to send the start-to-play time point and the media duration to the server, and the server feeds back an MPD fragment to the client according to the start-to-play time point and the media duration that are requested by the client. Optionally, the user request may not include the media duration, and the client does not carry the media duration in the MPD fragment obtaining request, but the client negotiates the media duration with the server in advance. After receiving the MPD fragment obtaining request, the server feeds back the MPD fragment to the client according to a play time point and a default media duration.

For example, when the client starts playing, the client sends the MPD fragment obtaining request including the start-to-play time point and the media duration to the server. For example, when an a.mpd fragment is requested, the server may be accessed by using the following URL: http://www.example.com/a.mpd?start=0&timespan=120, where start represents a start-to-play time point of media, and timespan represents a media duration. The foregoing URL indicates that the client requests an MPD fragment that starts from a second 0 of program time and has a duration of 120 seconds from the server.

Step 52: The client receives the MPD fragment that is fed back by the server and corresponds to the start-to-play time point and the media duration.

Step 53: The client sends a media segment obtaining request to the server according to the MPD fragment fed back by the server, so that the server searches for a media segment described by the MPD fragment.

Step 54: The client receives the media segment fed back by the server and described by the MPD fragment.

In the foregoing technical solution, when a client requests media to be played, the client sends an MPD fragment obtaining request including a start-to-play time point and a media duration to a server, and the server feeds back an MPD fragment corresponding to the start-to-play time point and the media duration to the client. The client obtains the MPD fragment instead of a complete MPD file from the server. Because the MPD fragment is small, it takes the client a short time to obtain the MPD fragment, and it also takes the client a short time to parse the MPD fragment. After obtaining the MPD fragment, the client may instantly obtain a media segment described by the MPD fragment from the server according to media description information of the MPD fragment, and therefore, a delay that the client starts playing a media file is shortened, and an objective of rapidly starting playing the media file is achieved.

Optionally, the client receives a first MPD fragment that is fed back by the server and corresponds to a media segment whose play time includes the start-to-play time point. If a media duration described by the first MPD fragment is shorter than a media duration requested by the client, the client continues to receive MPD fragments fed back by the server until a sum of media durations of all MPD fragments received by the client is longer than or equal to the media duration requested by the client.

Optionally, after the client receives the media segment fed back by the server and described by the MPD fragment, if play time of the media segment fed back by the server and described by the MPD fragment includes a next play time point, the client obtains a media segment corresponding to the next play time point from the server according to media description information in the MPD fragment fed back by the server.

In apparatus embodiments corresponding to FIG. 6, FIG. 7, FIG. 8, and FIG. 11, a media file sending apparatus fragments an MPD file in advance to generate an MPD fragment file including at least one MPD fragment, and establishes an MPD fragment index file for the MPD fragment file, where the MPD fragment index file includes an MPD fragment address. Before obtaining a media segment from the media file sending apparatus, a media file receiving apparatus sends an MPD fragment index file obtaining request to the media file sending apparatus first, obtains an MPD fragment index file generated by the media file sending apparatus, and then may determine an address of the MPD fragment according to the MPD fragment index file.

Figure 6:
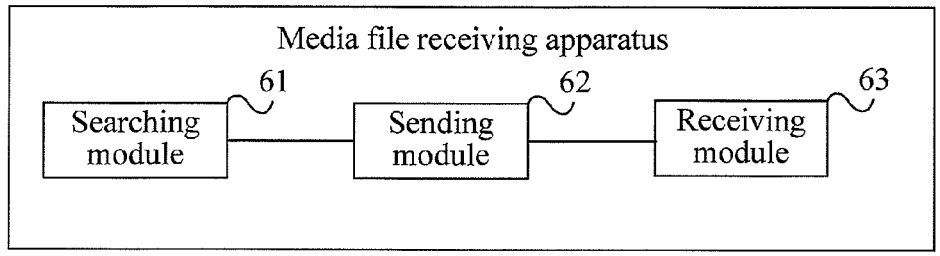
FIG. 6 is a schematic structural diagram of a media file receiving apparatus according to an embodiment of the present invention.

FIG. 6 is a schematic structural diagram of a media file receiving apparatus according to an embodiment of the present invention. As shown in FIG. 6, the apparatus according to this embodiment includes: a searching module 61, a sending module 62, and a receiving module 63.

The searching module 61 is configured to obtain an MPD fragment address of a first MPD fragment from a media presentation description MPD fragment index file according to a start-to-play time point requested by a user, where play time of a media segment corresponding to the first MPD fragment includes the start-to-play time point.

The sending module 62 is configured to send a first MPD fragment obtaining request including the MPD fragment address of the first MPD fragment to a server, so that the server obtains the first MPD fragment from a pre-stored MPD fragment file according to the MPD fragment address of the first MPD fragment.

The sending module 62 is further configured to send a media segment obtaining request to the server according to media description information in the first MPD fragment, so that the server obtains and feeds back, according to the media segment obtaining request, a media segment described by the first MPD fragment.

The receiving module 63 is configured to receive the first MPD fragment fed back by the server.

The receiving module 63 is further configured to receive the media segment fed back by the server and described by the first MPD fragment.

Further, the sending module 62 is further configured to send an MPD fragment index file obtaining request to the server. The receiving module 63 is further configured to receive the media presentation description MPD fragment index file that is fed back by the server according to the MPD fragment index file obtaining request.

Figure 8:
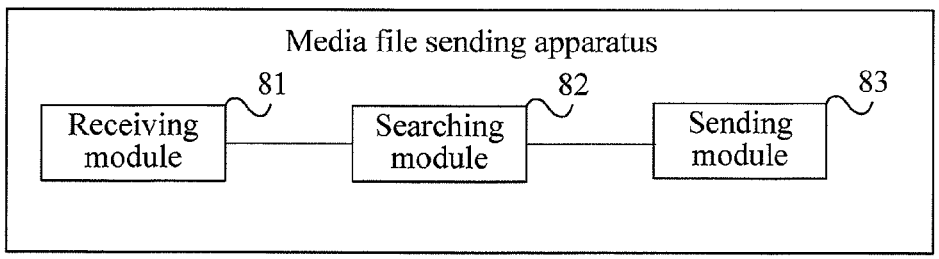
FIG. 8 is a schematic structural diagram of a media file sending apparatus according to an embodiment of the present invention.

FIG. 8 is a schematic structural diagram of a media file sending apparatus according to an embodiment of the present invention. As shown in FIG. 8, the apparatus according to this embodiment includes: a receiving module 81, a searching module 82, and a sending module 83.

The receiving module 81 is configured to receive an MPD fragment obtaining request that is sent by a client and includes a media presentation description MPD fragment address.

The searching module 82 is configured to search, according to the MPD fragment obtaining request received by the receiving module, a pre-stored MPD fragment file for an MPD fragment corresponding to the MPD fragment address.

The sending module 83 is configured to feed back the MPD fragment found by the searching module to the client.

The receiving module 81 is further configured to receive a media segment request sent by the client, and the sending module is further configured to feed back a media segment corresponding to the media segment request to the client.

Optionally, the receiving module 81 is further configured to receive an MPD fragment index file obtaining request sent by the client. The sending module 83 is further configured to send an MPD fragment index file corresponding to the MPD fragment index file obtaining request to the client, where index information of an MPD fragment in the MPD fragment index file includes a start-to-play time point and a media duration of a media segment described by the MPD fragment and an MPD fragment address of the MPD fragment.

Optionally, the apparatus shown in FIG. 8 may further include: an MPD fragmenting module.

The MPD fragmenting module is configured to fragment an MPD file according to a preset media duration to obtain at least one MPD fragment. The MPD fragmenting module is further configured to establish index information for each MPD fragment, and store the index information in the MPD fragment index file, where index information of an MPD fragment in the MPD fragment index file includes a start-to-play time point and a media duration of a media segment described by the MPD fragment and an MPD fragment address of the MPD fragment.

Figure 11:
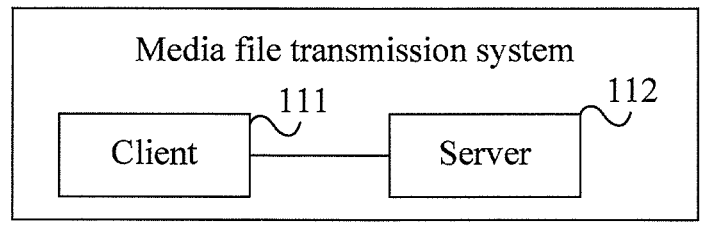
FIG. 11 is a schematic structural diagram of a media file transmission system according to an embodiment of the present invention.

FIG. 11 is a schematic structural diagram of a media file transmission system according to an embodiment of the present invention. The system shown in FIG. 11 includes: a client 111 and a server 112.

The client 111 is configured to obtain an MPD fragment address of a first MPD fragment from a media presentation description MPD fragment index file according to a start-to-play time point requested by a user, where play time of a media segment corresponding to the first MPD fragment includes the start-to-play time point.

The client 111 is further configured to send a first MPD fragment obtaining request including the MPD fragment address of the first MPD fragment to the server.

The server 112 is configured to obtain the first MPD fragment from a pre-stored MPD fragment file according to the MPD fragment address of the first MPD fragment, and feed back the first MPD fragment to the client.

The client 111 is further configured to receive the first MPD fragment fed back by the server, and send a media segment obtaining request to the server according to media description information in the first MPD fragment.

The server 112 is further configured to obtain and feed back a media segment described by the first MPD fragment to the client according to the media segment obtaining request.

The client 111 is further configured to receive the media segment fed back by the server and described by the first MPD fragment.

Optionally, the client 111 is further configured to send an MPD fragment index file obtaining request to the server; and the server feeds back the media presentation description MPD fragment index file to the client according to the MPD fragment index file obtaining request.

In the technical solutions provided in the embodiments corresponding to FIG. 6, FIG. 8, and FIG. 11, before a client obtains a media segment of a start-to-play time point from a server, the client searches, according to a start-to-play time point requested by a user, an MPD fragment index file for an address of an MPD fragment corresponding to a media segment whose play time includes the start-to-play time point, and requests the corresponding MPD fragment from the server according to the found address. Therefore, the client obtains the MPD fragment corresponding to the media segment whose play time includes the start-to-play time point instead of a complete MPD file from the server. Because the MPD fragment is small, it takes the client a short time to obtain the MPD fragment, and it also takes the client a short time to parse the MPD fragment. After obtaining the MPD fragment, the client may instantly obtain a media segment described by the MPD fragment from the server according to media description information of the MPD fragment, and therefore, a delay that the client starts playing a media file is shortened, and an objective of rapidly starting playing the media file is achieved.

Figure 7:
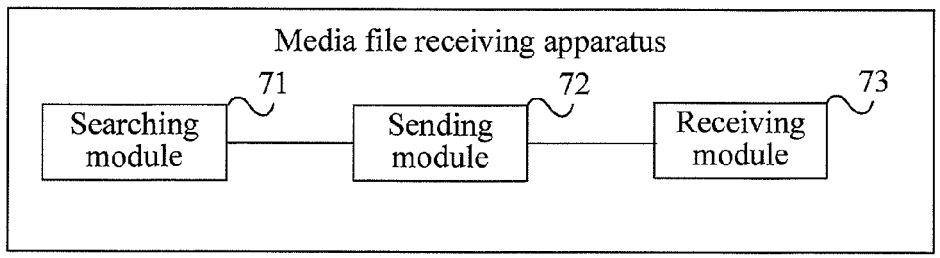
FIG. 7 is a schematic structural diagram of another media file receiving apparatus according to an embodiment of the present invention.

FIG. 7 is a schematic structural diagram of another media file receiving apparatus according to an embodiment of the present invention. As shown in FIG. 7, the apparatus according to this embodiment includes: a searching module 71, a sending module 72, and a receiving module 73.

The searching module 71 is configured to search a media presentation description MPD fragment index file for a first MPD fragment according to a start-to-play time point requested by a user, where play time of a media segment corresponding to the first MPD fragment includes the start-to-play time point, and the media presentation description MPD fragment index file includes at least one MPD fragment and includes a fragment address of the at least one MPD fragment.

The sending module 72 is configured to, if the searching module finds the first MPD fragment in the media presentation description MPD fragment index file, send a media segment request to a server according to media description information in the first MPD fragment.

The receiving module 73 is configured to receive a media segment that is fed back by the server according to the media segment request and described by the first MPD fragment.

Further, if the searching module fails to find the first MPD fragment in the media presentation description MPD fragment index file, functions of the foregoing modules are as follows:

The searching module is further configured to, if the searching module fails to find the first MPD fragment in the media presentation description MPD fragment index file, search the media presentation description MPD fragment index file for an MPD fragment address of the first MPD fragment according to the start-to-play time point requested by the user.

The sending module is further configured to send a first MPD fragment obtaining request including the MPD fragment address of the first MPD fragment to the server, so that the server obtains the first MPD fragment from a pre-stored MPD fragment file according to the MPD fragment address of the first MPD fragment.

The receiving module is further configured to receive the first MPD fragment fed back by the server.

The sending module is further configured to send a media segment obtaining request to the server according to the media description information in the first MPD fragment, so that the server obtains and feeds back, according to the media segment obtaining request, the media segment described by the first MPD fragment.

The receiving module is further configured to receive the media segment fed back by the server and described by the first MPD fragment.

Further, the foregoing media apparatus further obtains the MPD fragment index file from the server, which is specifically as follows:

The sending module is further configured to, before the MPD fragment address of the first MPD fragment is obtained from the media presentation description MPD fragment index file, send an MPD fragment index file obtaining request to the server.

The receiving module is further configured to receive the MPD fragment index file fed back by the server.

The receiving module is further configured to obtain user request information, where the user request information includes the start-to-play time point requested by the user.

In the technical solution provided in the embodiment corresponding to FIG. 7, before a client obtains a media segment of a start-to-play time point from a server, the client searches, according to a start-to-play time point requested by a user, an MPD fragment index file for an MPD fragment corresponding to a media segment whose play time includes the start-to-play time point, and obtains a media segment described by the MPD fragment from the server according to the found MPD fragment. Therefore, before obtaining the media segment, the client obtains the MPD fragment corresponding to the media segment whose play time includes the start-to-play time point instead of a complete MPD file from the server. Because the MPD fragment is small, it takes the client a short time to obtain the MPD fragment, and it also takes the client a short time to parse the MPD fragment. After obtaining the MPD fragment, the client may instantly obtain the media segment described by the MPD fragment from the server according to media description information of the MPD fragment, and therefore, a delay that the client starts playing a media file is shortened, and an objective of rapidly starting playing the media file is achieved.

Figure 9:
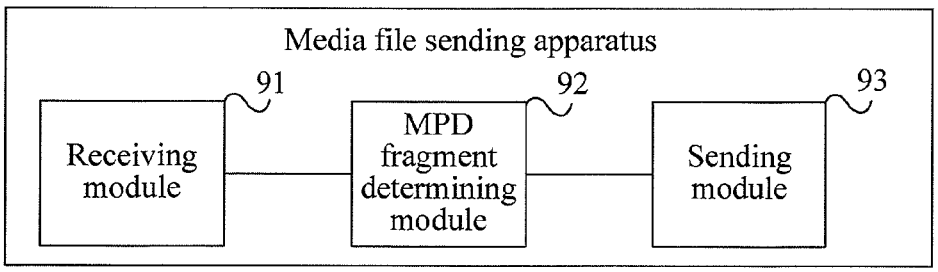
FIG. 9 is a schematic structural diagram of another media file sending apparatus according to an embodiment of the present invention.
Figure 10:
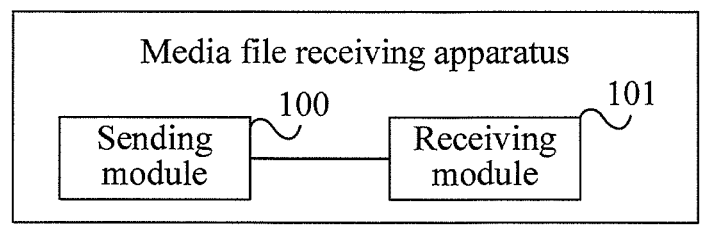
FIG. 10 is a schematic structural diagram of still another media file receiving apparatus according to an embodiment of the present invention.
Figure 12:
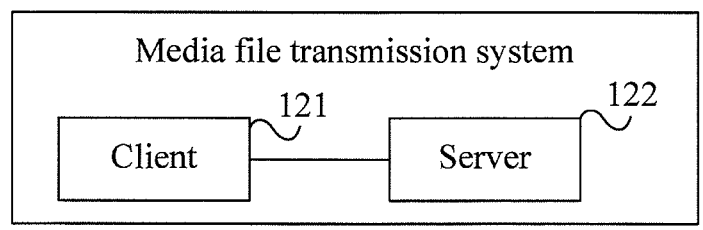
FIG. 12 is a schematic structural diagram of another media file transmission system according to an embodiment of the present invention.

A main difference between the following apparatus embodiments corresponding to FIG. 9, FIG. 10, and FIG. 12 and the apparatus embodiments corresponding to FIG. 6, FIG. 7, FIG. 8, and FIG. 11 lies in that: A media file receiving apparatus does not need to obtain an MPD fragment index file from a media file sending apparatus, but requests an MPD fragment corresponding to a start-to-play time point and a media duration directly from the media file sending apparatus.

FIG. 9 is a schematic structural diagram of a media file sending apparatus according to an embodiment of the present invention. As shown in FIG. 9, the apparatus according to this embodiment includes: a receiving module 91, an MPD fragment determining module 92, and a sending module 93.

The receiving module 91 is configured to receive a media presentation description MPD fragment obtaining request sent by a client, where the MPD fragment obtaining request includes a start-to-play time point and a media duration.

The MPD fragment determining module 92 is configured to determine, according to the start-to-play time point and the media duration, an MPD fragment corresponding to the start-to-play time point and the media duration.

The sending module 93 is configured to feed back the MPD fragment to the client.

The receiving module 91 is further configured to receive a media segment obtaining request sent by the client, where a media segment requested by the media segment obtaining request is described by the MPD fragment.

The sending module 93 is further configured to feedback the media segment described by the MPD fragment to the client.

Optionally, the MPD fragment determining module 92 is specifically configured to parse an MPD file according to the start-to-play time point and the media duration, and locate or assemble the MPD fragment corresponding to the start-to-play time point and the media duration in the MPD file.

Optionally, the MPD fragment determining module 92 is specifically configured to search, according to the start-to-play time point and an MPD fragment index file, a pre-stored MPD fragment file for a first MPD fragment corresponding to a media segment whose play time includes the start-to-play time point. Further, if a media duration described by the first MPD fragment is shorter than the media duration, a server searches for N MPD fragments following the first MPD fragment in the MPD fragment file and feeds back the N MPD fragments to the client until a total media duration of media segments described by the first MPD fragment and the N MPD fragments is longer than or equal to the media duration requested by the client, where N is a natural number.

FIG. 10 is a schematic structural diagram of still another media file receiving apparatus according to an embodiment of the present invention. As shown in FIG. 10, the apparatus according to this embodiment includes: a sending module 100 and a receiving module 101.

The sending module 100 is configured to send a media presentation description MPD fragment obtaining request including a start-to-play time point and a media duration to a server, so that the server determines, according to the start-to-play time point and the media duration, an MPD fragment corresponding to the start-to-play time point and the media duration.

The receiving module 101 is configured to receive the MPD fragment that is fed back by the server and corresponds to the start-to-play time point and the media duration.

The sending module 100 is configured to send a media segment obtaining request to the server according to the MPD fragment fed back by the server, so that the server searches for a media segment described by the MPD fragment.

The receiving module 101 is further configured to receive the media segment fed back by the server and described by the MPD fragment.

Optionally, the receiving module 101 is specifically configured to receive a first MPD fragment that is fed back by the server and corresponds to a media segment whose play time includes the start-to-play time point. Further, the receiving module 101 is further configured to, if a media duration described by the first MPD fragment is shorter than the media duration, receive N MPD fragments fed back by the server until a total media duration of media segments described by the first MPD fragment and the N MPD fragments is longer than or equal to the media duration requested by the client, where N is a natural number.

Optionally, the receiving module 101 is further configured to, after the client receives the media segment fed back by the server and described by the MPD fragment, if play time of the media segment fed back by the server and described by the MPD fragment includes a next play time point, obtain a media segment corresponding to the next play time point from the server according to media description information in the MPD fragment fed back by the server.

FIG. 12 is a schematic structural diagram of another media file transmission system according to an embodiment of the present invention. As shown in FIG. 12, the system according to this embodiment includes: a client 121 and a server 122.

The client 121 is configured to send a media presentation description MPD fragment obtaining request to the server, where the MPD fragment obtaining request includes a start-to-play time point and a media duration.

The server 122 is configured to receive the media presentation description MPD fragment obtaining request sent by the client.

The server 122 is further configured to determine, according to the start-to-play time point and the media duration, an MPD fragment corresponding to the start-to-play time point and the media duration, and feed back the MPD fragment to the client.

The client 121 is further configured to receive the MPD fragment, and the client sends a media segment obtaining request to the server according to a media segment described by the MPD fragment.

The server 122 is further configured to receive the media segment obtaining request sent by the client.

The server 122 is further configured to feed back the media segment described by the MPD fragment to the client according to the media segment obtaining request.

Optionally, the server 122 is specifically configured to parse an MPD file according to the start-to-play time point and the media duration, and locate or assemble the MPD fragment corresponding to the start-to-play time point and the media duration in the MPD file.

Optionally, the server 122 is specifically configured to search, according to the start-to-play time point and an MPD fragment index file, a pre-stored MPD fragment file for a first MPD fragment corresponding to a media segment whose play time includes the start-to-play time point, and feed back the first MPD fragment to the client.

In the technical solutions provided in the embodiments corresponding to FIG. 9, FIG. 10, and FIG. 12, when a client requests media to be played, the client sends an MPD fragment obtaining request including a start-to-play time point and a media duration to a server, and the server feeds back an MPD fragment corresponding to the start-to-play time point and the media duration to the client. The client obtains the MPD fragment instead of a complete MPD file from the server. Because the MPD fragment is small, it takes the client a short time to obtain the MPD fragment, and it also takes the client a short time to parse the MPD fragment. After obtaining the MPD fragment, the client may instantly obtain a media segment described by the MPD fragment from the server according to media description information of the MPD fragment, and therefore, a delay that the client starts playing a media file is shortened, and an objective of rapidly starting playing the media file is achieved.

It can be understood by a person of ordinary skill in the art that, all of or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may include any medium that is capable of storing program code, such as a ROM, a RAM, a magnetic disk, or an optical disc.

Finally, it should be noted that the foregoing embodiments are merely provided for describing the technical solutions of the present invention, but are not intended to limit the present invention. It should be understood by a person of ordinary skill in the art that although the present invention has been described in detail with reference to the foregoing embodiments, modifications can still be made to the technical solutions described in the foregoing embodiments, or equivalent replacements can be made to some or all technical features in the technical solutions, as long as such modifications or replacements do not make the essence of corresponding technical solutions depart from the scope of the technical solutions in the embodiments of the present invention.

What is claimed is:

1. A media file receiving method, comprising:
obtaining, by a client, an MPD fragment address of a first MPD fragment from a media presentation description (MPD) fragment index file according to a start-to-play time point requested by a user, wherein play time of a media segment corresponding to the first MPD fragment comprises the start-to-play time point;
sending, by the client, a first MPD fragment obtaining request comprising the MPD fragment address of the first MPD fragment to a server, so that the server obtains the first MPD fragment from a pre-stored MPD fragment file according to the MPD fragment address of the first MPD fragment;
receiving, by the client, the first MPD fragment fed back by the server, and sending a media segment obtaining request to the server according to media description information in the first MPD fragment, so that the server obtains and feeds back, according to the media segment obtaining request, a media segment described by the first MPD fragment;
receiving, by the client, the media segment fed back by the server and described by the first MPD fragment; and
when a next play time point received by the client and requested by the user is within play time of the media segment described by the first MPD fragment, obtaining, by the client, a media segment corresponding to the next play time point from the server according to the media description information in the first MPD fragment.

2. The method according to claim 1, wherein before the obtaining, by a client, an MPD fragment address of a first MPD fragment from a media presentation description (MPD) fragment index file according to a start-to-play time point requested by a user, the method further comprises:
sending, by the client, an MPD fragment index file obtaining request to the server, and receiving the MPD fragment index file that is fed back by the server according to the MPD fragment index file obtaining request.

3. A media file receiving method, comprising:
searching, by a client, a media presentation description (MPD) fragment index file for a first MPD fragment according to a start-to-play time point requested by a user, wherein play time of a media segment corresponding to the first MPD fragment comprises the start-to-play time point, and the MPD fragment index file comprises at least one MPD fragment and comprises a fragment address of the at least one MPD fragment; and
when the client finds the first MPD fragment in the MPD fragment index file, sending, by the client, a media segment request to a server according to media description information in the first MPD fragment, and receiving a media segment that is fed back by the server according to the media segment request and described by the first MPD fragment; and
when MPD fragment index file includes a fragment address for a next play time point received by the client and requested by the user, obtaining, by the client, a media segment corresponding to the next play time point from the server according to the fragment address for the next play time point included in the MPD fragment index file.

4. The method according to claim 3, wherein the method further comprises:
if the client fails to find the first MPD fragment in the MPD fragment index file,
searching, by the client, the MPD fragment index file for an MPD fragment address of the first MPD fragment according to the start-to-play time point requested by the user;
sending, by the client, a first MPD fragment obtaining request comprising the MPD fragment address of the first MPD fragment to the server, so that the server obtains the first MPD fragment from a pre-stored MPD fragment file according to the MPD fragment address of the first MPD fragment;
receiving, by the client, the first MPD fragment fed back by the server, and sending a media segment obtaining request to the server according to the media description information in the first MPD fragment, so that the server obtains and feeds back, according to the media segment obtaining request, the media segment described by the first MPD fragment; and
receiving, by the client, the media segment fed back by the server and described by the first MPD fragment.

5. The method according to claim 3, wherein before the obtaining, by a client, an MPD fragment address of a first MPD fragment from a media presentation description MPD fragment index file according to a start-to-play time point requested by a user, the method further comprises:
sending, by the client, an MPD fragment index file obtaining request to the server, and receiving the MPD fragment index file that is fed back by the server according to the MPD fragment index file obtaining request.

6. A media file sending method, comprising:
receiving, by the server, an MPD fragment index file obtaining request sent by the client, and sending an MPD fragment index file corresponding to the MPD fragment index file obtaining request to the client, wherein index information of an MPD fragment in the MPD fragment index file comprises a start-to-play time point and a media duration of a media segment described by the MPD fragment and an MPD fragment address of the MPD fragment;

receiving, by a server, an MPD fragment obtaining request that is sent by a client and comprises a media presentation description (MPD) fragment address, searching a pre-stored MPD fragment file for an MPD fragment corresponding to the MPD fragment address, and feeding back the found MPD fragment to the client;

receiving, by the server, a media segment request sent by the client, and feeding back a media segment corresponding to the media segment request to the client; and receiving, by the server, a second media request sent by the client for a second media segment with a next play time point, wherein the next play time point is within a play time of the MPD fragment corresponding to the MPD fragment address, and feeding back a second media segment corresponding to the second media request to the client.

7. The method according to claim 6, wherein before the receiving, by a server, an MPD fragment obtaining request that is sent by a client and comprises a media presentation description (MPD) fragment address, the method further comprises:

fragmenting, by the server, an MPD file according to a preset media duration to obtain at least one MPD fragment; and establishing, by the server, index information for each MPD fragment, and storing the index information in the MPD fragment index file, wherein index information of an MPD fragment in the MPD fragment index file comprises a start-to-play time point and a media duration of a media segment described by the MPD fragment and an MPD fragment address of the MPD fragment.

8. A media file sending method, comprising:

receiving, by a server, a media presentation description (MPD) fragment obtaining request sent by a client, wherein the MPD fragment obtaining request comprises a start-to-play time point and a media duration;

determining, by the server according to the start-to-play time point and the media duration, an MPD fragment corresponding to the start-to-play time point and the media duration, and feeding back the MPD fragment to the client;

receiving, by the server, a media segment obtaining request sent by the client, wherein a media segment requested by the media segment obtaining request is a media segment described by the MPD fragment; and feeding back, by the server according to the media segment obtaining request, the media segment described by the MPD fragment to the client; and receiving, by the server, a second media request sent by the client for a second media segment with a next play time point, wherein the next play time point is within a play time of the MPD fragment, and feeding back a second media segment corresponding to the second media request to the client.

9. The method according to claim 8, wherein the determining, by the server according to the start-to-play time point and the media duration, an MPD fragment corresponding to the start-to-play time point and the media duration comprises:

parsing, by the server, an MPD file according to the start-to-play time point and the media duration, and locating or assembling the MPD fragment corresponding to the start-to-play time point and the media duration in the MPD file.

10. The method according to claim 8, wherein the determining, by the server according to the start-to-play time point and the media duration, an MPD fragment corresponding to the start-to-play time point and the media duration, and feeding back the MPD fragment to the client comprises:

searching, by the server according to the start-to-play time point and an MPD fragment index file, a pre-stored MPD fragment file for a first MPD fragment corresponding to a media segment whose play time comprises the start-to-play time point; and feeding back, by the server, the first MPD fragment to the client.

11. The method according to claim 10, wherein the determining, by the server according to the start-to-play time point and the media duration, an MPD fragment corresponding to the start-to-play time point and the media duration, and feeding back the MPD fragment to the client further comprises:

if a media duration described by the first MPD fragment is shorter than the media duration, searching, by the server, for N MPD fragments following the first MPD fragment in the MPD fragment file and feeding back the N MPD fragments to the client until a total media duration of media segments described by the first MPD fragment and the N MPD fragments is longer than or equal to the media duration requested by the client, wherein N is a natural number.

12. A media file receiving apparatus, comprising:

a computer readable storage medium storing program code; and at least one processor configured for executing the program code to:

obtain an MPD fragment address of a first MPD fragment from a media presentation description (MPD) fragment index file according to a start-to-play time point requested by a user, wherein play time of a media segment corresponding to the first MPD fragment comprises the start-to-play time point;

send a first MPD fragment obtaining request comprising the MPD fragment address of the first MPD fragment to a server, so that the server obtains the first MPD fragment from a pre-stored MPD fragment file according to the MPD fragment address of the first MPD fragment, wherein send a media segment obtaining request to the server according to media description information in the first MPD fragment, so that the server obtains and feeds back, according to the media segment obtaining request, a media segment described by the first MPD fragment;

receive the first MPD fragment fed back by the server and receive the media segment fed back by the server and described by the first MPD fragment; and when MPD fragment index file includes a fragment address for a next play time point received by the client and requested by the user, receive a media segment corresponding to the next play time point from the server according to the fragment address for the next play time point included in the MPD fragment index file.

13. The apparatus according to claim 12, wherein the at least one processor is further configured for executing the program code to:

send an MPD fragment index file obtaining request to the server; and receive the MPD fragment index file that is fed back by the server according to the MPD fragment index file obtaining request.

14. A media file receiving apparatus, comprising:
a computer readable storage medium storing program code; and
at least one processor configured for executing the program code to:
search a media presentation description (MPD) fragment index file for a first MPD fragment according to a start-to-play time point requested by a user, wherein play time of a media segment corresponding to the first MPD fragment comprises the start-to-play time point, and the media presentation description MPD fragment index file comprises at least one MPD fragment and comprises a fragment address of the at least one MPD fragment;
if the first MPD fragment is found in the MPD fragment index file, send a media segment request to a server according to media description information in the first MPD fragment;
receive a media segment that is fed back by the server according to the media segment request and described by the first MPD fragment;
when MPD fragment index file includes a fragment address for a next play time point received by the client and requested by the user, receive a media segment corresponding to the next play time point from the server according to the fragment address for the next play time point included in the MPD fragment index file.

15. The receiving apparatus according to claim 14, wherein the at least one processor is further configured for executing the program code to:
if the first MPD fragment is not found in the MPD fragment index file, search the MPD fragment index file for an MPD fragment address of the first MPD fragment according to the start-to-play time point requested by the user;
send a first MPD fragment obtaining request comprising the MPD fragment address of the first MPD fragment to the server, so that the server obtains the first MPD fragment from a pre-stored MPD fragment file according to the MPD fragment address of the first MPD fragment;
receive the first MPD fragment fed back by the server;
send a media segment obtaining request to the server according to the media description information in the first MPD fragment, so that the server obtains and feeds back, according to the media segment obtaining request, the media segment described by the first MPD fragment; and
receive the media segment fed back by the server and described by the first MPD fragment.

16. The receiving apparatus according to claim 14, wherein the at least one processor is further configured for executing the program code to:
send an MPD fragment index file obtaining request to the server;
receive the MPD fragment index file fed back by the server; and
obtain user request information, wherein the user request information comprises the start-to-play time point requested by the user.

17. A media file sending apparatus, comprising:
a computer readable storage medium storing program code; and
at least one processor configured for executing the program code to:
receive an MPD fragment obtaining request that is sent by a client and comprises a media presentation description (MPD) fragment address;
search, according to the received MPD fragment obtaining request, a pre-stored MPD fragment file for an MPD fragment corresponding to the MPD fragment address; and
feed back the found MPD fragment to the client;
receive a media segment request sent by the client;
feed back a media segment corresponding to the media segment request to the client; receive a second media request sent by the client for a second media segment with a next play time point, wherein the next play time point is within a play time of the MPD fragment corresponding to the MPD fragment address; and
feed back a second media segment corresponding to the second media request to the client.

18. The apparatus according to claim 17, wherein the at least one processor is further configured for executing the program code to:
receive an MPD fragment index file obtaining request sent by the client; and
send an MPD fragment index file corresponding to the MPD fragment index file obtaining request to the client, wherein index information of an MPD fragment in the MPD fragment index file comprises a start-to-play time point and a media duration of a media segment described by the MPD fragment and an MPD fragment address of the MPD fragment.

19. The apparatus according to claim 17, wherein the at least one processor is further configured for executing the program code to:
fragment an MPD file according to a preset media duration to obtain at least one MPD fragment;
establish index information for each MPD fragment; and
store the index information in the MPD fragment index file, wherein index information of an MPD fragment in the MPD fragment index file comprises a start-to-play time point and a media duration of a media segment described by the MPD fragment and an MPD fragment address of the MPD fragment.

20. A media file transmission system, comprising: a client and a server, the client and server each comprising at least one processor; wherein
the client is configured for obtaining an MPD fragment address of a first MPD fragment from a media presentation description (MPD) fragment index file according to a start-to-play time point requested by a user, wherein play time of a media segment corresponding to the first MPD fragment comprises the start-to-play time point;
the client is further configured for sending a first MPD fragment obtaining request comprising the MPD fragment address of the first MPD fragment to the server;
the server is configured for obtaining the first MPD fragment from a pre-stored MPD fragment file according to the MPD fragment address of the first MPD fragment, and feed back the first MPD fragment to the client;
the client is further configured for receiving the first MPD fragment fed back by the server, and send a media segment obtaining request to the server according to media description information in the first MPD fragment;

the server is further configured for obtaining and feeding back a media segment described by the first MPD fragment to the client according to the media segment obtaining request;

the client is further configured for receiving the media segment fed back by the server and described by the first MPD fragment; and the server is further configured for receiving a second media request sent by the client for a second media segment with a next play time point, wherein the next play time point is within a play time of the first MPD fragment, and feed back a second media segment corresponding to the second media request to the client.

21. The system according to claim 20, wherein the client is further configured for sending an MPD fragment index file obtaining request to the server; and the server feeds back the MPD fragment index file to the client according to the MPD fragment index file obtaining request.

22. A media file transmission system, comprising: a client and a server, the client and server each comprising at least one processor; wherein the client is configured for sending a media presentation description (MPD) fragment obtaining request to the server, wherein the MPD fragment obtaining request comprises a start-to-play time point and a media duration;

the server is configured for receiving the MPD fragment obtaining request sent by the client;

the server is further configured for determining, according to the start-to-play time point and the media duration, an MPD fragment corresponding to the start-to-play time point and the media duration, and feed back the MPD fragment to the client;

the client is further configured for receiving the MPD fragment, and the client sends a media segment obtaining request to the server according to a media segment described by the MPD fragment;

the server is further configured for receiving the media segment obtaining request sent by the client;

the server is further configured for feeding back the media segment described by the MPD fragment to the client according to the media segment obtaining request; and the server is further configured for receiving a second media request sent by the client for a second media segment with a next play time point, wherein the next play time point is within a play time described by the MPD fragment, and feed back a second media segment corresponding to the second media request to the client.

23. The system according to claim 22, wherein the server is specifically configured for parsing an MPD file according to the start-to-play time point and the media duration, and for locating or assembling the MPD fragment corresponding to the start-to-play time point and the media duration in the MPD file.

24. The system according to claim 22, wherein the server is specifically configured for searching, according to the start-to-play time point and an MPD fragment index file, a pre-stored MPD fragment file for a first MPD fragment corresponding to a media segment whose play time comprises the start-to-play time point; and for feeding back the first MPD fragment to the client.

* * * * *